United States Patent [19]

Fujii et al.

[11] Patent Number: 4,867,561
[45] Date of Patent: Sep. 19, 1989

[54] APPARATUS FOR OPTICALLY DETECTING AN EXTRANEOUS MATTER ON A TRANSLUCENT SHIELD

[75] Inventors: Tetsuo Fujii, Toyohashi; Hirohito Shioya, Anjo; Tiaki Mizuno, Toyota; Tadashi Kamada, Aichi; Yasuaki Makino, Okazaki; Yoshimi Yoshino, Inuyama; Seiichiro Otake, Aichi, all of Japan

[73] Assignee: Nippondenso Co., Ltd., Kariya, Japan

[21] Appl. No.: 87,168

[22] Filed: Aug. 18, 1987

[30] Foreign Application Priority Data

Aug. 22, 1986 [JP] Japan .................. 61-197872
Jul. 20, 1987 [JP] Japan .................. 62-180814

[51] Int. Cl.$^4$ ............................... B60S 1/08
[52] U.S. Cl. .................... 356/237; 318/483; 15/250 C
[58] Field of Search ............ 356/237, 444, 445; 318/480, 483, DIG. 2; 15/250 C, 250.02; 250/345

[56] References Cited

U.S. PATENT DOCUMENTS

| | | | |
|---|---|---|---|
| 4,476,419 | 10/1984 | Fukatsu et al. | 318/483 |
| 4,595,866 | 6/1986 | Fukatsu et al. | 15/250 C |
| 4,620,141 | 10/1986 | McCumber et al. | 318/444 |

FOREIGN PATENT DOCUMENTS

| | | | |
|---|---|---|---|
| 0009414 | 4/1980 | European Pat. Off. | 318/483 |
| 0106348 | 6/1984 | Japan | 15/250 C |
| 59-199347 | 11/1984 | Japan . | |

OTHER PUBLICATIONS

"An Intermittent Wiper System with a Raindrop Sensor" by Kazuyuki MORI et al.; SAE Technical Paper Series 851637 pp. 1-7.

Primary Examiner—Vincent P. McGraw
Assistant Examiner—S. A. Turner
Attorney, Agent, or Firm—Cushman, Darby & Cushman

[57] ABSTRACT

An apparatus for optically detecting the attachment state of extraneous matters to a translucent shield member. The optically detecting apparatus comprises a light-emitting unit having a plurality of light-emitting elements each emitting a light ray toward the translucent shield member, a photoelectric transducer unit having a plurality of transducer elements each receiving each of the light rays reflected on the translucent shield member, and a data processing unit coupled to the transducer unit. The transducer unit generates detection signals corresponding to the quantities of the received light rays and the data processing unit successively compares the level of each of the detection signals with a predetermined level to produce binary signals in accordance with the results of the comparison so that a binary signal pattern is defined at the respective transducer elements. The data processing unit determines the attachment state of the extraneous matters to the translucent shield member by comparing the defined binary signal pattern with a reference pattern.

34 Claims, 13 Drawing Sheets

APPARATUS FOR OPTICALLY DETECTING AN EXTRANEOUS MATTER ON A TRANSLUCENT SHIELD

BACKGROUND OF THE INVENTION

The present invention relates generally to an apparatus for optically detecting the presence of extraneous mater such as waterdrops on a translucent shield. The present invention may be embodied, for example, in a windshield wiper control system for motor vehicles, but will be appreciated that it is also useful in other applications.

It is known that such an optically detecting apparatus is employed to windshield wiper control for motor vehicles and is arranged so as to detect extraneous raindrops on the outer surface of the windshield by means of a sensing device comprising a light-emitting diode and a phototransistor which is located at the inner surface side thereof. An important problem in such an arrangement relates to the fact that the detection area is narrow, and in order to extend the detection area it is required to use a number of sensor devices, which causes obstruction to the driver's vision. One possible solution is that a sensor device comprising an piezoelectric element is provided on the bonnet of the motor vehicle so as to detect the vibration produced in the bonnet due to the falling of raindrops thereto. However, this raindrop sensing system arises a problem in durability because of non-protection against the weather.

SUMMARY OF THE INVENTION

The present invention has been developed in order to remove the above-mentioned drawbacks inherent to the conventional detecting systems.

It is therefore an object of the present invention to provide a new and improved optically detecting apparatus which is capable of accurately detecting the presence of extraneous matter on a translucent member over a wide range concurrently with eliminating the problem in durability.

In accordance with the present invention, there is provided an apparatus for optically detecting the presence of extraneous matters on a translucent shield member, comprising light-emitting means installed at the inside of the translucent shield member and having a plurality of light-emitting elements each emitting a light ray toward the translucent shield member, transducer means having a plurality of transducer elements each receiving each of the light rays reflected on the translucent shield member, the transducer means generating detection signals corresponding to the reflection light received by the plurality of transducer elements. Also included in the optical detecting apparatus is data processing means responsive to the generated detection signals where the detection signals are compared with a predetermined level to produce binary signals in accordance with the results of the comparison so that a binary signal pattern is formed in connection with the respective transducer elements, before the formed binary signal pattern is compared with a reference pattern to count the detection signals with high level or the high-level signals of the produced binary signals are counted directly. The data processing means determines the presence of the extraneous matter on the translucent shield member on the basis of the number of the high-level signals.

In accordance with the present invention, there is further provided an apparatus for optically detecting the presence of extraneous matter on a windshield of a motor vehicle, comprising light-emitting means installed at the inside of the windshield and having a plurality of light-emitting elements each emitting a light ray toward the outer surface of the windshield, first transducer means having a plurality of transducer elements each receiving each of the light rays reflected on the outer surface of the windshield and for first detection signals corresponding to quantities of the reflection light received by the plurality of transducer elements, second transducer means having at least one transducer element for receiving the external light introduced from the outside of said windshield into said optically detecting apparatus, said second transducer means generating a second detection signal corresponding to the quantity of external light. Also included in the optically detecting apparatus is data processing means responsive to the first detection signals and the second detection signal. The data processing means successively compares the level of each of the first detection signals with a first predetermined reference level so as to generate a high-level signal when the level of each of the first detection signals is higher than the first predetermined reference level and compares the level of the second detection signal with a second predetermined reference level. The data processing means determines the attachment state of the extraneous matter on the windshield on the basis of the number of the generated high-level signals and determines the degree of brightness outside the motor vehicle in accordance with the result of the comparison of the level of the second detection signal with the second predetermined reference level.

Preferably, the first predetermined reference level is adjusted in accordance with the result of the comparison of the level of the second detection signal with the second predetermined reference level, that is, when the level of the second detection signal is lower than the second predetermined reference level, the first predetermined reference level is lowered whereby accurate detection of the extraneous matters is ensured irrespective of the degree of brightness outside of the motor vehicle.

More preferably, the optical detecting apparatus further comprises a second light-emitting means having a plurality of light-emitting elements, each emitting a light ray toward the inner surface of the windshield, and a third transducer means having a plurality of transducer elements, each receiving each of the light rays reflected on the inner surface of the windshield, for generating third detection signals corresponding to quantities of the reflection light received by the plurality of transducer elements thereof. Therefore, the data processing means successively compares the level of each of the third detection signals with a third predetermined reference level so as to produce a high-level signal when the level of each of the third detection signals is higher than the third predetermined reference level and can determine a fogging state on the inner surface of the windshield on the basis of the number of the produced high-level signals.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
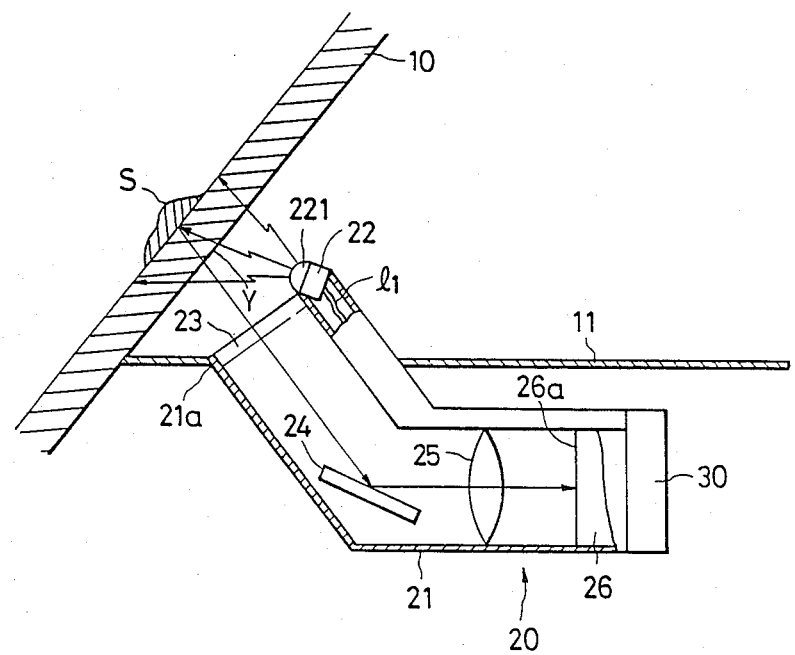
FIG. 1 is a cross-sectional view showing an apparatus for optically detecting a raindrop attached to a windshield according to a first embodiment of the present invention which is incorporated into a windshield wiper control system for a motor vehicle.
Figure 3:
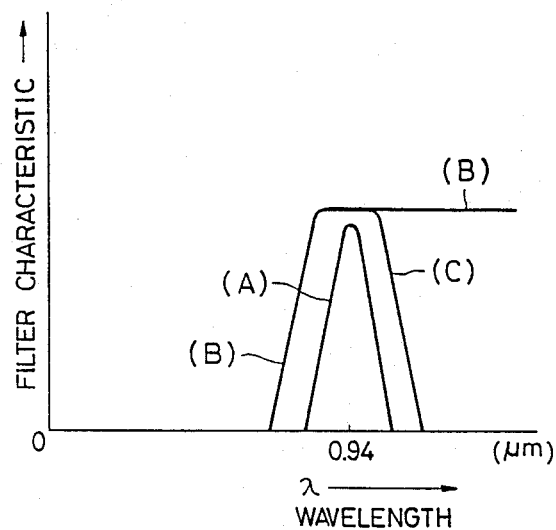
FIG. 3 is an illustration for describing the characteristic of an infrared filter and the characteristic of an infrared radiation from an infrared-emitting diode used in the optically detecting apparatus of the first embodiment.
Figure 4:
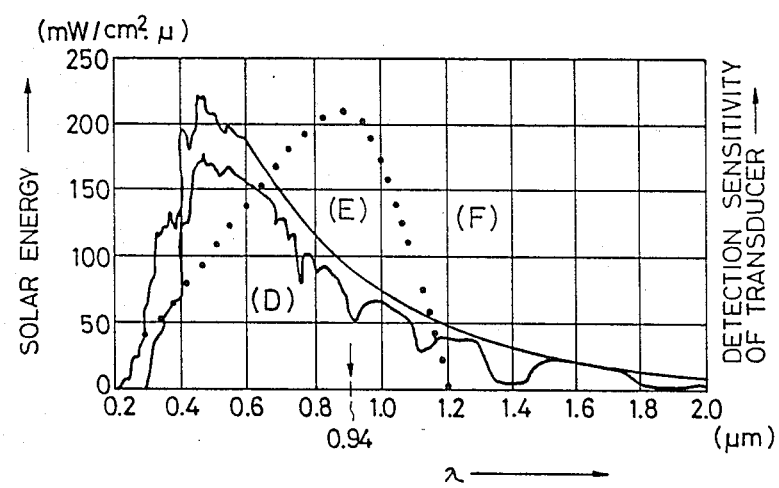
FIG. 4 is an illustration for describing the relationship between the solar energy and the infrared radiation from the infrared-emitting diode or the light received by an image detector.

Referring now to FIG. 1, there is illustrated an apparatus for optically detecting a raindrop S attached to a windshield which is incorporated into a windshield wiper control system for use in motor vehicles. The optically detecting apparatus 20 is fitted into a hole of a dashboard 1 defined in the vicinity of a lower edge portion of the inner surface of a windshield 10. As illustrated in FIG. 1, the optically detecting apparatus 20 has a curved cylindrical case 21, one end opening portion 21a of which is arranged to face a portion of the windshield 10 which is wiped by a wiper, not shown. A light-emitting device 22 is installed at a part of the end opening portion 21a of the case 21 so that its light-emitting surface 221 faces the wiping portion of the windshield 10. The light-emitting device 22 has an infrared-emitting diode 222 (FIG. 2) therein and the infrared radiation produced by the infrared-emitting diode 222 is radially emitted from the light-emitting surface 221 thereof toward the wiping portion of the windshield 10. The infrared light from the infrared-emitting diode 222 has a characteristic as indicated by A in FIG. 3, that is, the peak value is obtained when the wavelength is about 0.94 micrometers. This means that the peak value of the infrared light corresponds to a lower value of the solar energy as shown in FIG. 4, resulting in reduction of influence of the disturbance light as much as possible. In FIG. 4, a characteristic D represents a spectral distribution of the solar energy on earth and a characteristic E represents a spectral distribution of the solar energy in outer space.

Turning back to FIG. 1, in a part of the end opening portion 21a. other than the part at which the light-emitting device 22 is placed, is fitted an infrared transmission filter 23 for reflecting disturbance light, such as ultraviolet component and visible light component of sun light, and for passing only infrared light components. In detail, the infrared transmission filter 23 may be a filter having a characteristic as indicated by B in FIG. 3 or a band-pass filter having a characteristic as indicated by C in FIG. 3, i.e., passing light having a wavelength in, or in the vicinity of the infrared region. A reflector 24 is fixedly secured at the curved portion in the case 21 by a proper method so that an infrared radiation passed through the infrared transmission filer 23 is reflected toward a convex lens 25 installed in the case 21 which in turn collimates the light reflected from the reflector 24 and introduces the collimated light into an image detecting unit, or photoelectric transducer unit, 26 fitted in the vicinity of the other end opening portion of the case 21. The photoelectric transducer unit 26 may be constructed by two-dimensionally arranging first through fiftieth transducer elements, or pixels, and in response to the collimated light from the convex lens 25 to a light-receiving surface 26a thereof, the first through fiftieth transducer elements successively generating image signals, each indicative of incident infrared radiation. In this case, when the light received by the image sensor 26 is infrared light which is reflected by a raindrop S attached to the windshield 10 after emitted from the light-emitting device 22, the image signals respectively include information relating to the raindrop S. Each of the transducer elements of the photoelectric transducer unit 26 is made of silicon semiconductor and the transducer unit 26 has a characteristic as indicated by F in FIG. 4 wherein the peak value is obtained under the condition of the wavelength of 8000 to 10000 Å.

Figure 2:
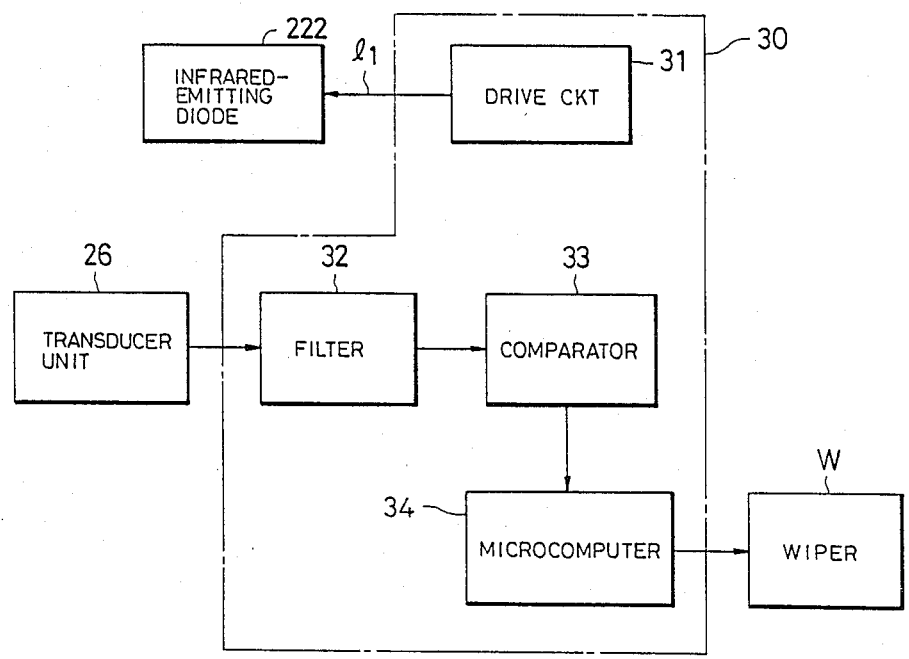
FIG. 2 is a block diagram showing an arrangement of a data processing unit of the optically detecting apparatus of FIG. 1.

At the other end opening portion of the case 21 is provided a signal processing unit 30 which, as shown in FIG. 2, comprises a drive circuit 31, a filter 32, a comparator 33 and a microcomputer 34. The drive circuit 31 is coupled through a wiring device 11 to the infrared-emitting diode 222 of the light-emitting device 22 for supplying a drive signal thereto. The filter 32 removes the noise components from the image signals from the first to fiftieth transducer elements thereof and generates first to fiftieth filter signals. The filter 32 is connected to the comparator 33 in which the levels of the first to fiftieth filter signals are compared with a reference, for checking whether raindrops are attached to the windshield 10, to successively generate first through fiftieth comparison signals in accordance with the results of the comparison. The comparator 33 may generate a low-level signal or a high-level signal in the binary state as the comparison signal. The microcomputer 34, in response to the comparison signals, executes operations shown in FIGS. 5 and 6 in accordance with programmed instructions stored in a read-only memory (ROM) thereof whereby decision is made in terms of presence or absence of extraneous raindrops S and control of a windshield wiper W is performed in accordance with the decision. The operations are executed at regular intervals.

In operations, in response to actuation of the windshield wiper control system, the drive circuit 31 generates a drive signal under control of the microcomputer 34 so that the infrared-emitting diode 222 radially, or divergently, emits infrared light toward the wiping portion of the windshield 10. Concurrently with the generation of the drive signal, first and second timers of the microcomputer 34 are actuated to count predetermined time periods T1 and T2. Thereafter, when the raindrops S is not attached to the windshield 10, the infrared light from the light-emitting device 22 is introduced into the optically detecting apparatus 20 due to total reflection. On the other hand, when the raindrop S is attached to the wiping portion of the windshield 10, the infrared light from the light-emitting device 22 into the optically detecting apparatus 20 is reduced because of a lack of total reflection. The incident infrared light reaches the photoelectric transducer unit 26 after passing through the infrared filter 23, the reflector 24 and the convex lens 25. As described above, in response to the reflected infrared light, the photoelectric transducer unit 26 successively and repeatedly generates first to fiftieth image signals. The filter 32 generates first to fiftieth filter signals and supplies them to the comparator 33 which in turn generates first to fiftieth comparison signals. Since the attached raindrop S runs with the passage of time, the levels of the comparison signals are varied in response to variations of some of the first to fiftieth image signals.

Figure 5:
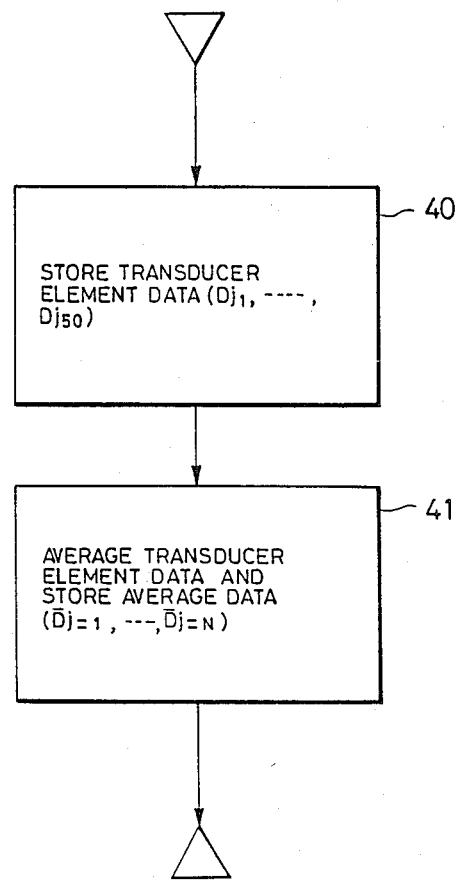
FIGS. 5 and 6 are flow charts showing operations for detecting the presence of extraneous matters, on a windshield which are executed in accordance with instructions from a microcomputer.

In response to elapse of the predetermined time period T1, the microcomputer 34 executes the operation shown in FIG. 5. In a step 40, the microcomputer 34 stores the first to fiftieth comparison signals in its random access memory (RAM) as transducer element data $D_{j=1}=(D_{j=1, i=1}, \ldots, D_{j=1, i=50})$, $D_{j=2}=(D_{j=2, i=21}, \ldots, D_{j=2, i=50})$, $\ldots$, $D_{j=N}=(D_{j=N, i=1}, \ldots, D_{j=N, i=50})$ where N is an integer of $0<N<50$. Here, when the comparison signal is in the high-level state, the transducer element data $D_{j}i$ assumes "1". In a subsequent step 41, the microcomputer 34 averages each of the transducer element data $D_{j=1}, \ldots, D_{j=n}$, that $$\sum_{i=1}^{50} D_{j=1, i}/50, \ldots, \sum_{i=1}^{50} D_{j=N, i}/50$$

and stores the average data $\overline{D}_{j=1}, \ldots \overline{D}_{j=N}$ in the RAM.

Figure 6:
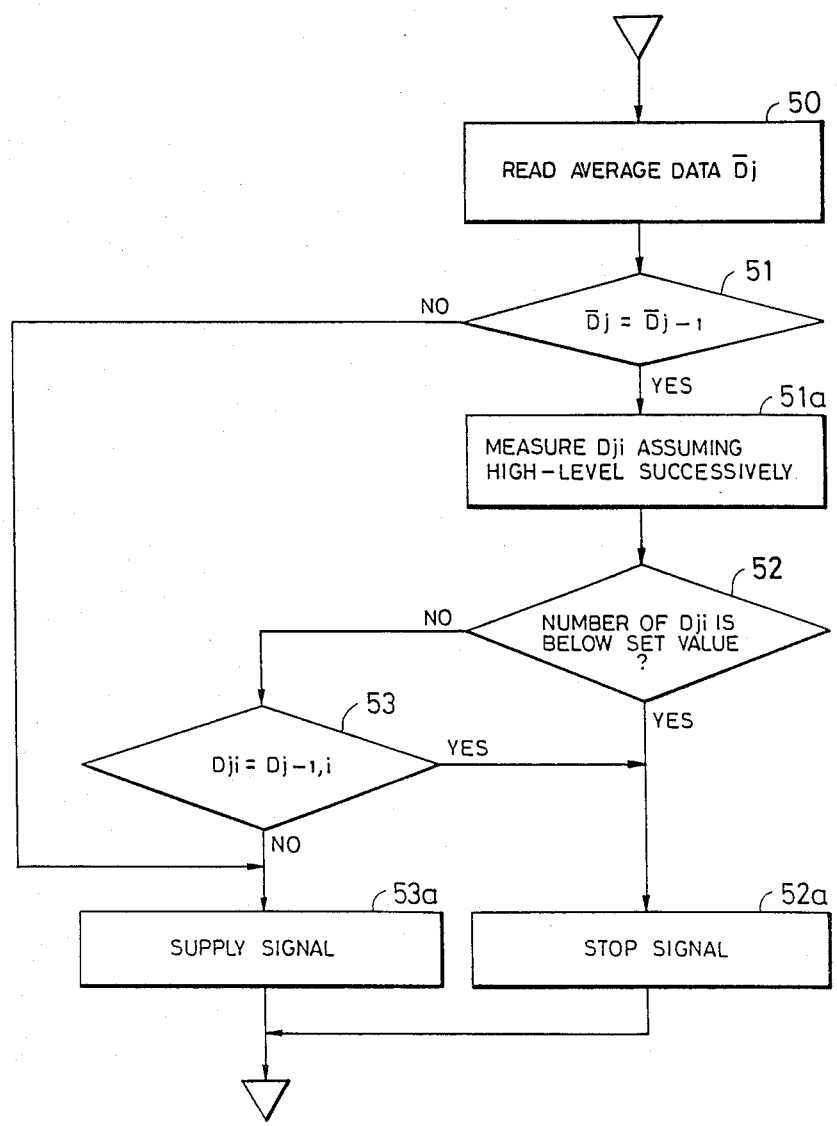

Thereafter, in response to elapse of the predetermined time period T2, the microcomputer 34 executes the operation shown in FIG. 6. A step 50 is executed to read the average data and a step 51 is then executed to perform comparison between the present data and the previous data. In accordance with the results of the comparison, control goes to a step 53a or 51a. In the step 51a, the number of successive high-level data $D_{j}i$ is measured, and in a step 52 the number is compared with a reference number. If the number is above the reference number, the microcomputer 34 decides that raindrops S are present on the windshield 10, followed by a step 53 in which it is checked whether the present data $D_{j}i$ is coincident with the previous data $Dj-1$, i. Since both data are not coincident with each other in the case of flowing of the raindrop S, control goes to the step 53a to generate a control signal for operation of the windshield wiper W. In the step 52, if the number is below the reference number because, for an ample, it stops raining, control goes to a step 52a to stop the generation of the control signal. On the other hand, if the decision in step 52 is "NO" irrespective of a stoppage of raining, such as when solids such as dust are attached to the windshield 10, since the data $D_{j}i$ is equal to the data $Dj-1$, the operational flow goes through the step 53 to the step 52a to stop the generation of the control signal, resulting in prevention of malfunction of the windshield wiper W.

Figure 7:
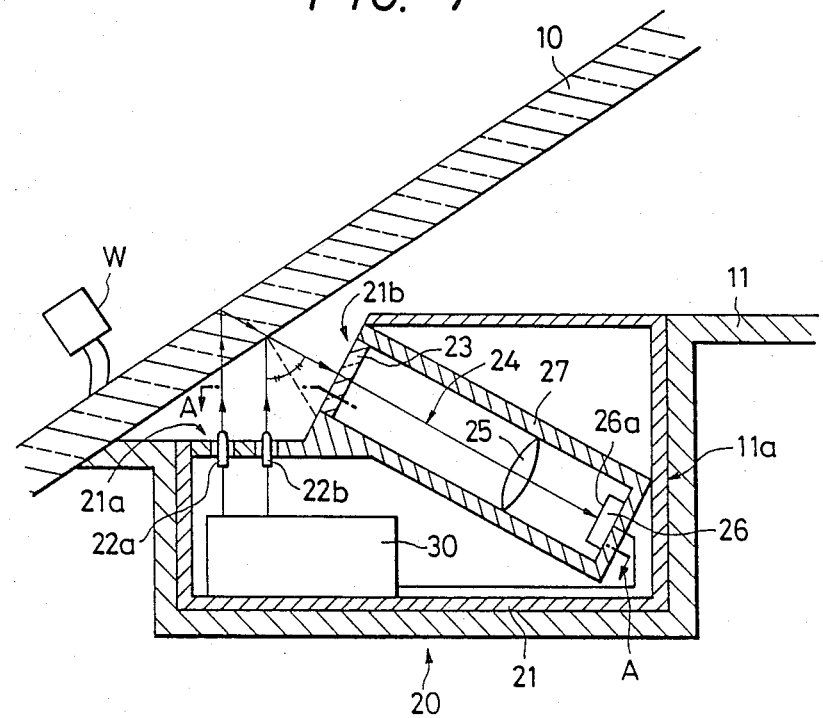
FIG. 7 is a cross-sectional view showing an apparatus for optically detecting extraneous matter on a windshield which is incorporated in a windshield wiper control system or a fog removing system for use in a motor vehicle.
Figure 8:
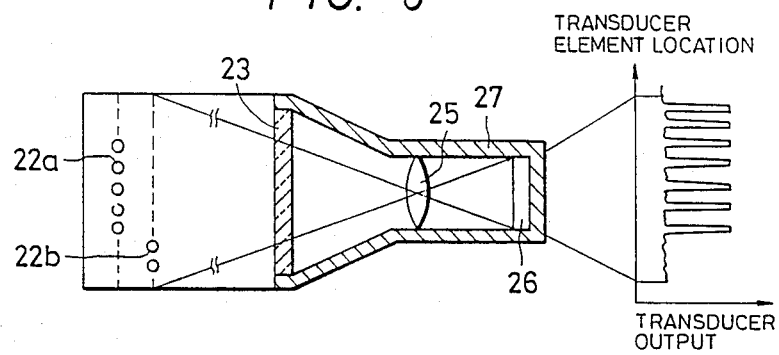
FIG. 8 is a cross-sectional view taken along line A—A of FIG. 7.
Figure 9:
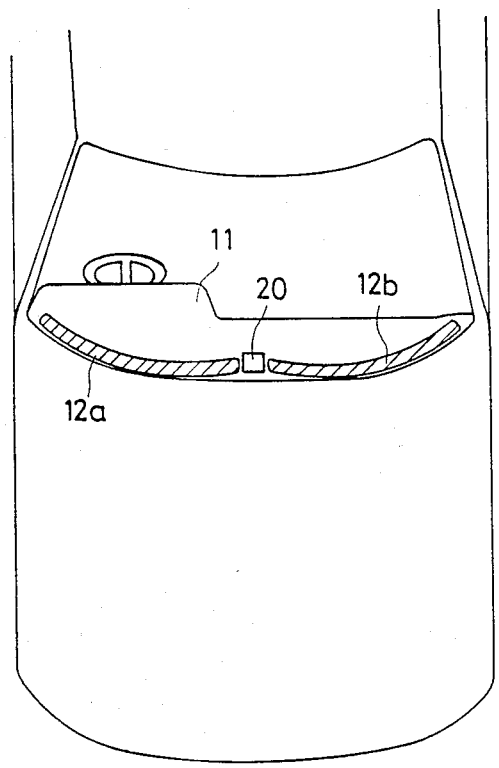
FIG. 9 is an illustration for describing the position at which the optically detecting apparatus is installed within the motor vehicle.

FIGS. 7 and 8 show an optically detecting apparatus according to a second embodiment of the present invention which acts as raindrop detection apparatus, fog detection apparatus, etc., which is incorporated into a windshield wiper system for use in motor vehicles. FIG. 7 is a cross-sectional view of the entire optically detecting apparatus 20 and FIG. 8 is a cross-sectional view taken along line A—A of FIG. 7. In FIGS. 7 and 8, the optically detecting apparatus 20 is fitted in a recess portion 11a defined on a dashboard 11 positioned in the vicinity of a windshield 10, the recess portion 11a being positioned between blowout openings 12a and 12b of an air conditioner of the motor vehicle as shown in FIG. 9. A case 21 of the optically detecting apparatus 20 has first and second opening portions 21a and 21b which face a wiping portion of the windshield 10, respectively. At the first opening portion 21a are provided first and second light-emitting devices 22a and 22b each comprising a plurality of infrared-emitting diodes linearly arranged. The first light-emitting device 22a is arranged so that the optical axis of the emitted light makes a predetermined angle to the outer surface of the windshield 10, the predetermined angle being between the critical angle with respect to air, i.e., critical angle assumed when an extraneous matter is absent on the wiping portion of the windshield 10, and the critical angle with respect to an extraneous matter, i.e., critical angle taken when the extraneous matter is present thereon. On the other hand, the second light-emitting device 22b is arranged so that the optical axis of the emitted light makes a predetermined angle to the inner surface of the windshield 10. As a result of the arrangements of the first and second light-emitting devices 22a and 22b, the optical axis of light emitted from each of the infrared-emitting diodes of the first light-emitting device 22a is substantially coincident with the optical axis of light emitted from the corresponding one of the infrared-emitting diodes of the second light-emitting device 22b, the optical axis being illustrated by numeral 24 in FIG. 7. If raindrops are attached to a portion of the outer surface of the windshield 10, a part of the light emitted from the first light-emitting device 22a is not substantially total-reflected and therefore the light is not reflected to be introduced into the optically detecting apparatus 20. Furthermore, if a portion of the inner surface of the windshield 10 is fogged or has wet dew, a part of the light emitted from the second light-emitting device 22b is scattered or transmitted and therefore the light is not reflected to be introduced thereinto. The characteristic of each of the infrared diodes of the light-emitting devices 22a and 22b is similar to that of the infrared-emitting diode 222 described above in the first embodiment.

Figure 10:
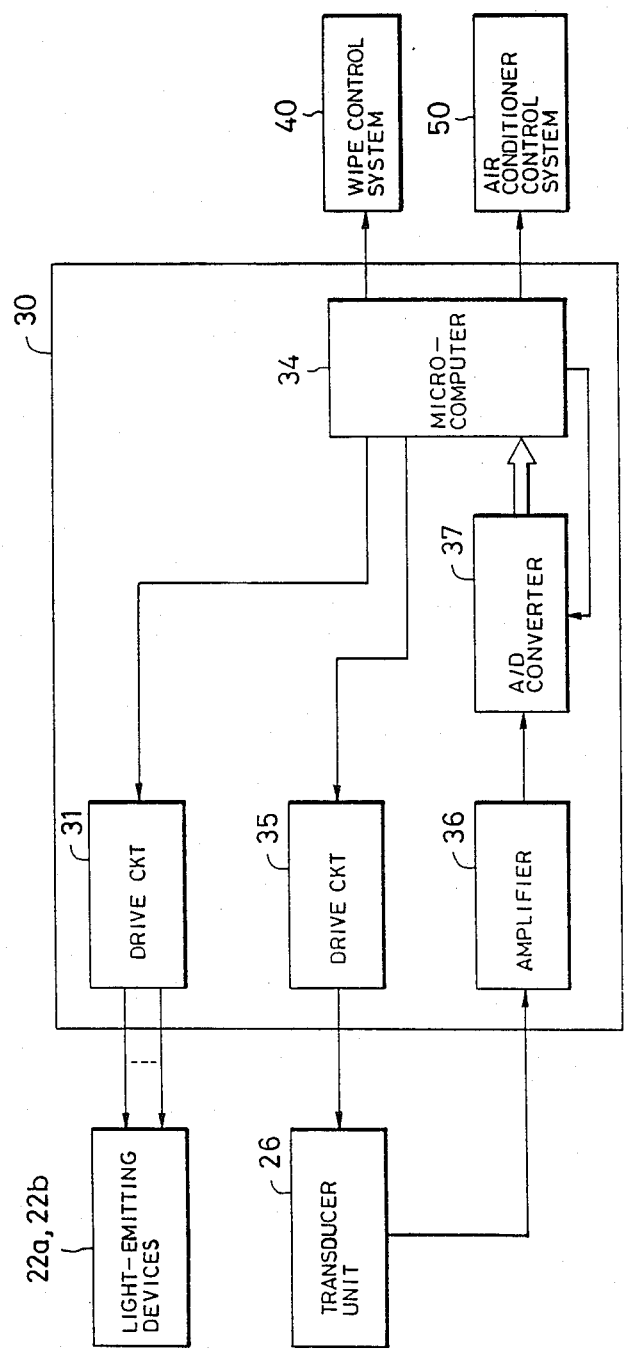
FIG. 10 is a block diagram illustrating an arrangement of a data processing unit of the optically detecting apparatus of FIG. 7.

Within the case 21 is provided an inner cylindrical case 27 which is fixedly secured to the case 21 at a given angle so that one end portion of the inner case 27 is positioned at the second opening portion 21b of the case 21. Light reflected on the windshield 10 is introduced through an infrared filter 23 and a convex lens 25 into a photoelectric transducer unit 26 placed at the other end portion of the inner case 27 and having a characteristic as indicated by F in FIG. 4 wherein the peak value is obtained when the wavelength is 0.8 to 1.0 micrometers. The convex lens 25 is provided so that each of the introduced infrared light rays is focused on the light-receiving surface 26a of the photoelectric transducer unit 26. The transducer unit 26 comprises a number of transducer elements (for example, 1024) which are arranged one-dimensionally and, in response to reception of the reflected infrared light or external light such as sun light by the light-receiving surface 26, each of the transducer elements thereof generates an analog detection signal with level corresponding to the amount of the received light. Within the case 21 is also provided a signal processing unit 30 which, as shown in FIG. 10, comprises a light-emitting device drive circuit 31 for driving the first and second light-emitting devices 22a and 22b, a drive circuit 35 for driving the photoelectric transducer unit 26 by supplying a clock signal with a predetermined separation thereto, an amplifier circuit 36 for amplifying the detection signals supplied from the transducer unit 26, an analog-to-digital converter 37 for converting the detection signals into digital form, and a microcomputer 34 for controlling the drive circuits 31 and 25 and further a wiper control system 40 and an air conditioning system 50 in accordance with the detection signals from the transducer unit 26.

Operation executed by the microcomputer 34 will be described hereinbelow with reference to FIGS. 11A, 11B and 12 through 16.

Figure 11A:
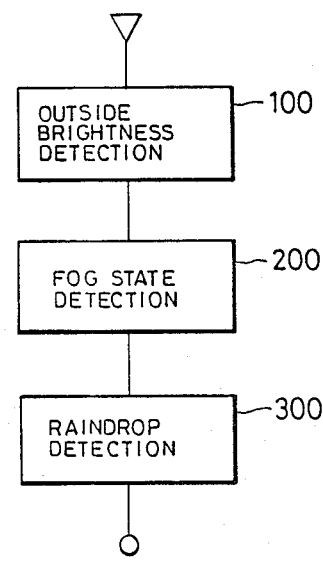
FIG. 11A is a flow chart showing the whole operation executed in the second embodiment.
Figure 11B:
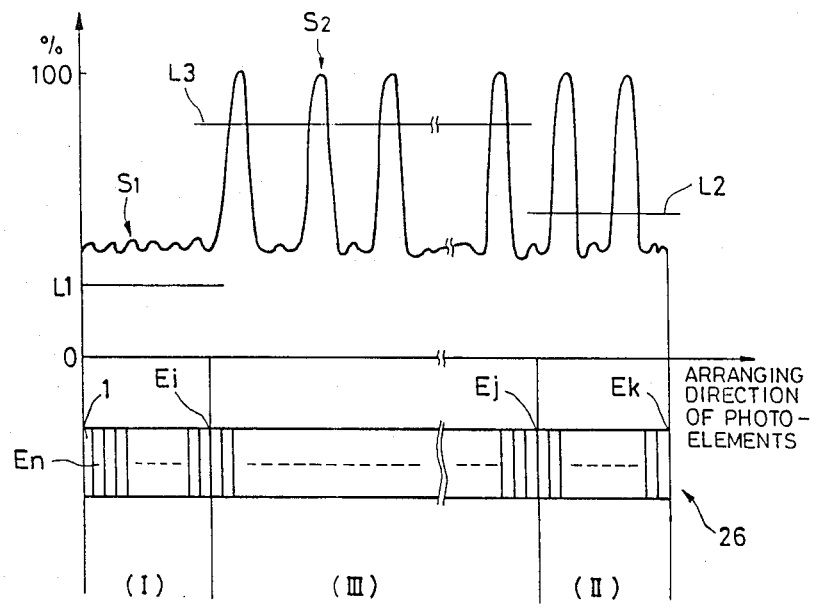
FIG. 11B a graphic illustration for describing the basis of the second embodiment.

FIG. 11A is a flow chart showing the entire operation executed in response to turning-on of an automatic mode switch, not shown, which is manipulated by the vehicle driver. The operation of FIG. 11A comprises a block 100 for deciding the brightness outside the motor vehicle, a block 200 for detecting the fogged state or dewed state of the inner surface of the windshield 10, and a block 300 for detecting the presence of raindrops on the outer surface of the windshield 10. FIG. 11B is an illustration for describing the basis of the operation of FIG. 11A. The photoelectric transducer unit 26 comprises a plurality of transducer elements $E_n$ arranged one-dimensionally, and of these transducer elements, the $E_l$ to $E_i$ transducer elements are assigned for the execution of the block 100 and placed in a region (I) in FIG. 11B, the $E_{i+1}$ to $E_j$ transducer elements are assigned for the execution of the block 300 and placed in a region (III) in the figure, and the $E_{j+1}$ to $E_k$ transducer elements are assigned for the execution of the block 200 and placed in a region (II) in the figure. The optical system of the optically detecting apparatus 20 is arranged so that the reflection light rays of the light rays emitted from the infrared-emitting diodes (for example, five diodes) of the first light-emitting device 22a are focused on the transducer elements placed in the region (III) and the reflection light rays of the light rays emitted from the infrared-emitting diodes (for example, two diodes) of the second light-emitting device 22b are focused on the transducer elements placed in the region (II). The output waveform shown in FIG. 11B is in the case that the motor vehicle is lightened by the sun or the like, that is, the outside of the vehicle is bright, and there is no raindrop and fog on the windshield 10, and in this case the output is the sum of the reflection light component Sl and the external light component S2 and assumes the maximum value. Therefore, it is possible to detect whether the outside of the vehicle is bright by comparing the output levels of the transducer elements in the region (I) with a first predetermined level L1. Furthermore, by comparing the output levels of the transducer elements in the region (II) with a second predetermined level L2 and measuring the number of the outputs with level higher than the second predetermined level L2 or the number of the transducer elements producing the output levels higher (or lower) than the second predetermined level L2, it is possible to decide the fogging state of the windshield 10. In addition, similarly by comparing the output levels of the transducer elements in the region (III) with a third predetermined level L3 and counting the number of the outputs with level higher than the third predetermined level L3 or the number of the transducer elements producing the output levels higher (or lower) than the third predetermined level L3, it is possible to decide the raindrop presence, i.e., rainfalling state. Here, it may be required that the first to third predetermined levels L1 to L3 are adjusted in advance before the mounting of the optically detecting apparatus.

Figure 12:
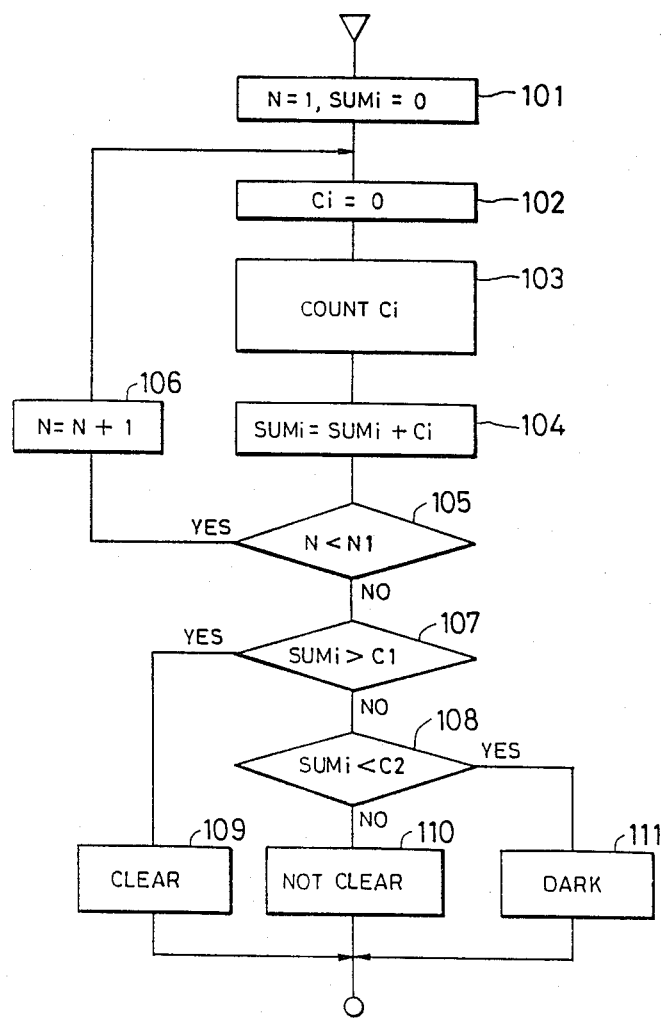
FIG. 12 is a flow chart showing operation for detecting the brightness outside the motor vehicle.

FIG. 12 is a flow chart showing the processes executed in the block 100 of FIG. 11A for detection of brightness outside the motor vehicle. Initially, steps 101 and 102 are executed for initialization wherein a first counter is set to 1, a second counter is reset to 0, and a third counter is reset to 0. In a subsequent step 103, the microcomputer 34 reads the detection signals from the $E_l$ to $E_i$ transducer elements and compares the read detection signals in level with the first predetermined level L1 to count the number of the detection signals (high-level signals) which exceeds the first predetermined level L1 or count the number of the transducer elements of the $E_l$ to $E_i$ transducer elements each of which generates a detection signal with level higher than the first predetermined level L1 by the third counter. A step 104 is then executed to add the count value C1 of the third counter to the count value SUMi of the second counter, followed by a step 105 in which the count value N of the first counter is compared with a predetermined value N1. If N<N1, the operational flow returns to the step 102 through a step 106 in which the first counter is incremented by one, that is, the first counter counts the number of executions between the step 102 and 14. The steps 102 to 104 are repeatedly executed until the count value N becomes equal to the predetermined value N1. If the count value N becomes equal to the predetermined value N1 in the step 105, a step 107 is executed to check whether the count value SUMi of the second counter, indicative of the sum of the high-level signals generated until the count value N becomes equal to the predetermined value N1, is greater than a predetermined value C1. If so, the microcomputer 34 decides in a step 109 that the outside of the motor vehicle is bright. If not, a step 108 is executed to check whether the count value SUMi thereof is smaller than a predetermined value C2. If so, the microcomputer 34 decides in a step 111 that the outside of the vehicle is dark. If not, the microcomputer 34 decides in a step 110 that the outside thereof is not bright. That is, the microcomputer 34 determines the degree of brightness in accordance with the count value SUMi of the second counter.

Figure 13:
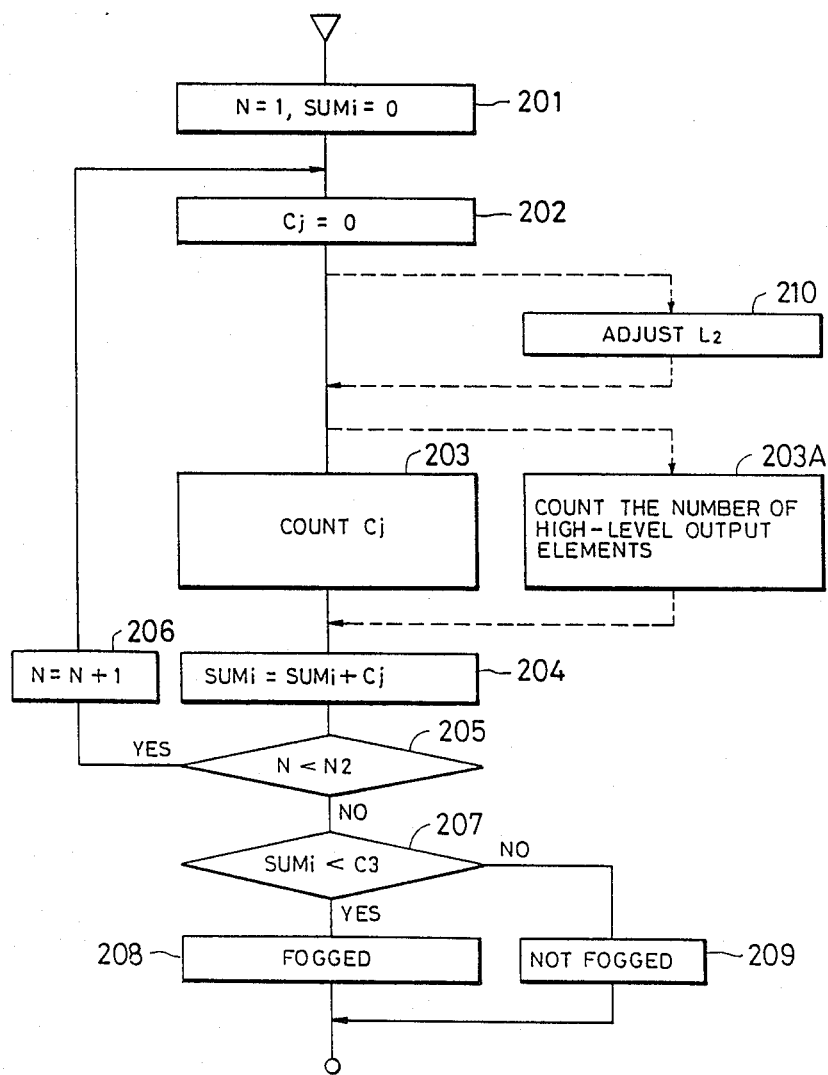
FIG. 13 is a flow chart showing operation executed for detecting the fogging state on the inner surface of a windshield of the motor vehicle.

FIG. 13 is a flow chart showing the processes executed in the block 200 of FIG. 11A for detection of the fogging state on the windshield 10. In steps 201 and 202, initialization is performed wherein a fourth counter is set to 1, a fifth counter is reset to 0, and a sixth counter is reset to 0. In a subsequent step 203, the microcomputer 34 reads the detection signals from the transducer elements $E_{j+1}$ to $E_k$ in the region (II) and, of these detection signals, counts the number of the detection signals with level higher than the second predetermined level L2 (or the number of the transducer elements generating the high-level signals) by means of the sixth counter Here, the detection signals are compared with the second predetermined level L2 to produce binary signals in accordance with the results of the comparison so that a binary signal pattern is formed in connection with the respective transducer elements. The formed binary signal pattern is then compared with a reference pattern to count the number of detection signals with high level; note that the embodiment may be varied so that or the high-level signals of the produced binary signals are counted directly. The count value Cj of the sixth counter is added to the count value SUMj of the fifth counter in a step 204, followed by a step 205 in which it is checked whether the count value N of the fourth counter is equal to a predetermined value N2. If not, the operational flow returns to the step 202 through a step 206 in which the fourth counter is incremented by one. After repetition of the execution of the steps 202 to 204, if the count value N becomes equal to the predetermined value N2, a step 207 is executed to compare the count value SUMj of the fifth counter with a predetermined value C3. The repetition of the execution of the steps 202 to 204 causes standardization of the fogging state. If SUMj<C3 in the step 207, the microcomputer 34 decides in a step 208 that the windshield 10 is in the fogged state. That is, when the windshield is in the fogged state, the number of the detection signals with level higher than the predetermined level L2 is decreased because of scattering. If not, the microcomputer decides in a step 209 that it is not in the fogged state.

In the case that counted the number of the transducer elements which generate the detection signals is higher than the predetermined level L2, a step 203A is executed instead of the step 203. In this case, the detection signals from the transducer elements $E_{j+1}$ to $E_k$ are converted into binary signals by comparing the levels of the detection signals with a reference level, and the number of the transducer elements is determined by comparing the pattern of the binary signals with reference patterns stored in a ROM in advance. Here, in order to improve the fog detection accuracy in the nighttime, a step 210 may be provided between the step 202 and the step 203 wherein the predetermined level L2 is lowered by a predetermined amount in connection with the process of the step 111 in FIG. 12 or in response to turning-on of the light switch of the vehicle. Furthermore, the microcomputer 34 can be arranged to determine malfunction of the optically detecting apparatus in accordance with the generating state of the detection signal. In this case, the microcomputer 34 may cancel the detection signals and perform the processes on the basis of newly generated detection signals. This operation is performed similarly in raindrop detection process which will be described hereinafter.

Figure 14:
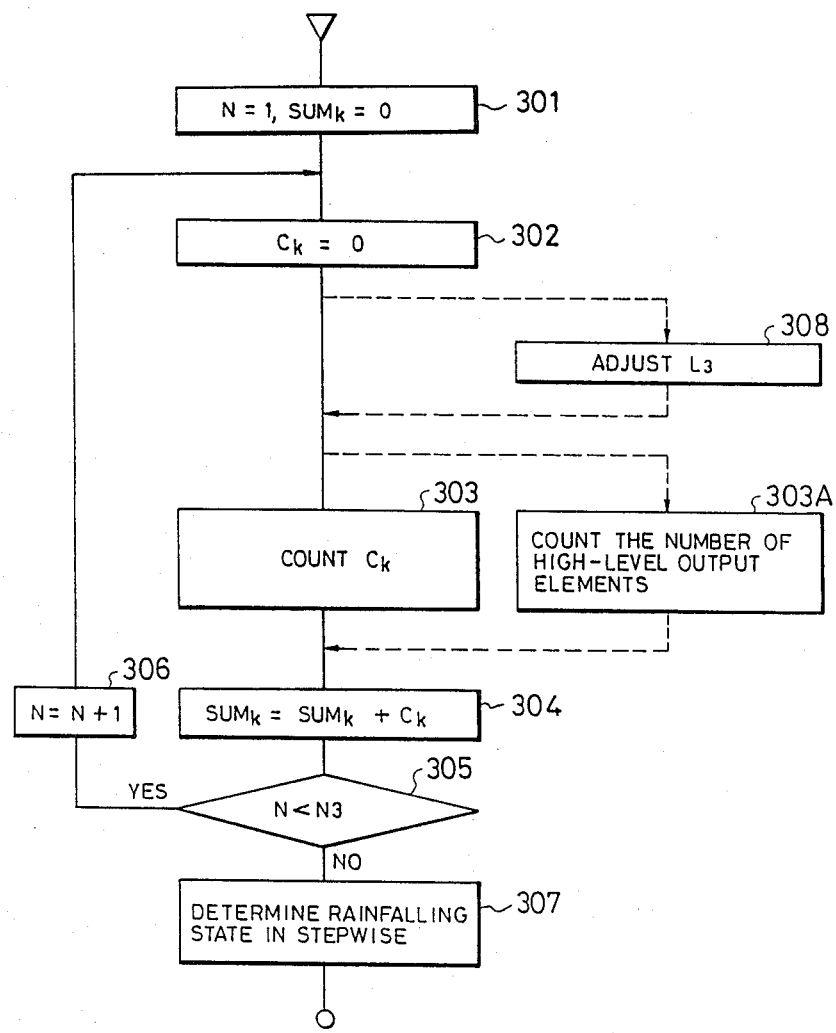
FIG. 14 is a flow chart showing operation executed for detecting the presence of raindrops on the outer surface of the windshield thereof.

FIG. 14 is a flow chart showing the processes executed in the block 300 in FIG. 11A for the raindrop detection. In steps 301 and 302, the initialization of the microcomputer 34 is performed wherein a seventh counter is set to 1, an eighth counter is reset to 0, and a ninth counter is reset to 0. In a subsequent step 303, the microcomputer 34 reads the detection signals from the transducer elements $E_{i+1}$ to $E_j$ and counts the number of the detection signals with level higher than the predetermined level L3 by means of the ninth counter. The count value Ck of the ninth counter is added to the count value SUMk of the eighth counter in a step 304. A step 305 is then executed to check whether the count value N of the seventh counter is smaller than a predetermined value N3. If not, that is, when the process of each of the steps 302 to 304 is not performed N3 times, the operational flow returns to the step 302 through a step 306 in which the seventh counter is incremented by one. Here, a step 303 A is executed in place of the step 303 in the case that the number of the transducer elements which generate detection signals is counted to be higher than the predetermined level L3. If N becomes equal to N3 in the step 305, a step 307 is executed to determine the rainfalling state in accordance with the count value SUMk of the eighth counter. The raining state is severally graded to correspond to the magnitude of the count value SUMk. Similarly, in order to improve the raindrop detection accuracy in the nighttime, a step 308 can be provided between the step 302 and the step 303 so that the value of the predetermined level L3 is adjusted.

Figure 15A:
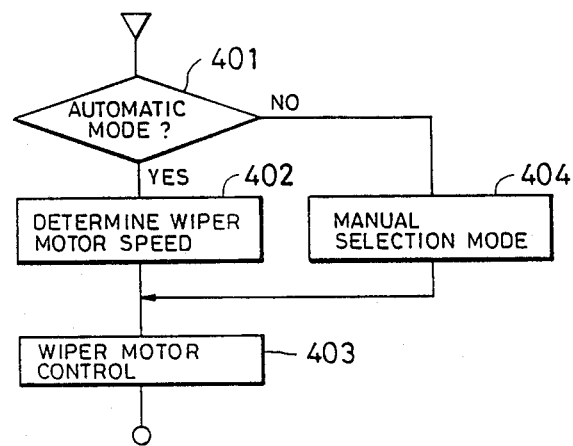
FIG. 15A is a flow chart for describing the operation for control a windshield wiper of the motor vehicle which is executed in connection with the operations of FIGS. 12 to 14.
Figure 15B:
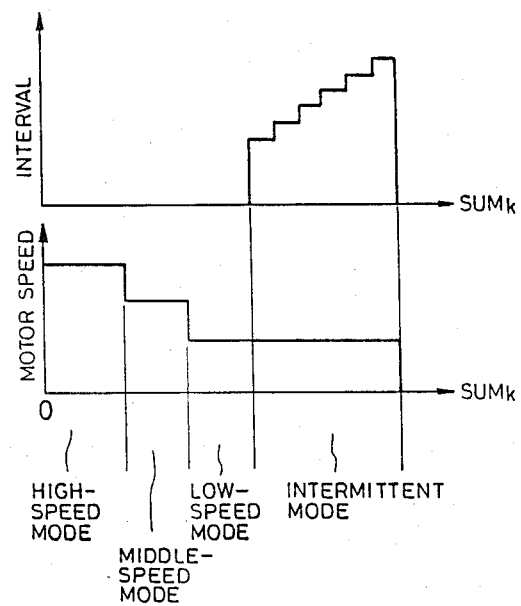
FIG. 15B is an illustration for describing the windshield wiper control.

FIG. 15A is a flow chart showing an example of control of the wiper performed on the basis of the results of the above-mentioned operation. FIG. 15B is an illustration useful for describing the control process in FIG. 15A. In FIG. 15A, a step 401 is first executed to check whether the wiper W is in the automatic mode. If so, a step 402 is executed to determine the wiper motor speed on the basis of the count value SUMk as shown in FIG. 15B, followed by a step 403 to perform the wiper motor speed control. As understood from FIG. 15B, as the count value SUMk becomes smaller, the operation interval of the wiper is shortened and the wiper operating mode is switched into low-speed mode, middle-speed mode and high-speed mode in sequence. On the other hand, if not in the step 401, the wiper motor control is performed manually.

Figure 16:
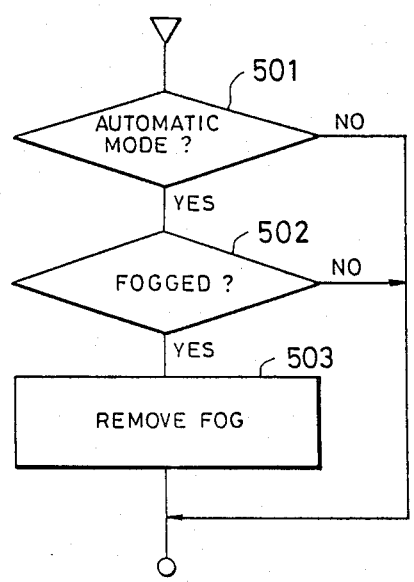
FIG. 16 is a flow chart for describing control of an air conditioner of the motor vehicle which in performed in connection with the operations of FIGS. 12 to 14.

FIG. 16 is a flow chart showing an example of control of the air conditioner performed on the basis of the results of the above-mentioned operation. A step 501 is first executed to check whether the air conditioner is in the automatic mode. If so, a step 502 follows to check the presence or absence of fog on the windshield 10 on the basis of the result of the FIG. 13 operation. If fog is present, a step 503 is executed to generate a control signal, so that the air conditioner is controlled to remove the fog attached thereto.

Although in the second embodiment the outputs of the photoelectric transducer 26 is A/D-converted before reaching the microcomputer 34, it is also appropriate that, in place of the A/D converter 37, first to third comparators are provided in parallel at the output side of the amplifier 36 so that the outputs of the respective comparators are read under time sharing control in accordance with instructions from the microcomputer 34, resulting in reduction of capacity of a memory for storing the A/D converted detection data.

It should be understood that the foregoing relates to only preferred embodiments of the present invention, and that it is intended to cover all changes and modifications of the embodiments of this invention herein used for the purposes of the disclosure, which do not constitute departures from the spirit and scope of this invention. For example, in the first embodiment, the bar code pattern is formed at a portion of the windshield 10 which is illuminated by light from the infrared-emitting diode and the raindrop presence is determined in accordance with variation of the bar code pattern due to presence of raindrops.

What is claimed is:

1. An apparatus for optically detecting the presence of extraneous matter on a windshield comprising:
    first light-emitting means for emitting light from an inner side of said windshield toward an outer surface of said windshield to cause a light reflection form said outer surface;
    second light-emitting means for emitting light from the inner side of said windshield toward an inner surface of said windshield to cause a light reflection from said inner surface;
    first transducer means for receiving said light reflection from said outer surface of said windshield and generating a first detection signal corresponding to a quantity of the reflection light received by said first transducer means;
    second transducer means for receiving a quantity of external light from an outer side of said windshield and generating a second detection signal corresponding to a quantity of external light;
    third transducer means for receiving said light reflection from said inner surface of said windshield and generating a third detection signal corresponding to a quantity of the reflection light received by said third transducer means; and
    data processing means responsive to said first, second and third detection signals for:
    (a) successively comparing the level of said first detection signal with a first predetermined reference level so as to generate a first high-level signal when the level of said first detection signal is higher than said first predetermined reference level, and determining the presence of extraneous matters on said windshield on the basis of the number of the generated first high-level signals,
    (b) comparing the level of said second detection signal with a second predetermined reference level so as to determine a second result and determining the degree of brightness outside said windshield in accordance with said second result, and
    (c) successively comparing the level of said third detection signal with a third predetermined reference level so as to generate a third high-level signal when the level of said third detection signal is higher than said third predetermined reference level and determining the presence of extraneous matter on the inner surface of said windshield on the basis of the number of the generated third high-level signals.

2. Apparatus as in claim 1, wherein said first predetermined reference level is adjusted in response to said second result.

3. Apparatus as in claim 1, wherein said third predetermined reference level is adjusted in response to said second result.

4. Apparatus as in claim 1, wherein said first and second light-emitting means are located away from said inner surface of said windshield.

5. An apparatus for optically detecting the presence of extraneous matter on a windshield, comprising:
    first light-emitting means, located at an inner side of said windshield away from an inner surface of said windshield, for emitting light toward an outer surface of said windshield to cause a light reflection from said outer surface;
    second light-emitting means, located at said inner side of said windshield away from said inner surface of said windshield, for emitting light toward said inner surface of said windshield to cause a light reflection from said inner surface;
    transducer means for receiving both said light reflections from said outer and inner surfaces of said windshield and generating first and second detection signals respectively corresponding to respective quantities of the said light reflections from said outer and inner surfaces of said windshield; and
    data processing means responsive to said first and second detection signals for:
    (a) successively comparing the level of said first detection signal with a first predetermined reference level so as to generate a first high-level signal whenever the level of said first detection signal is higher than said first predetermined reference level and determining the presence of extraneous matter on the outer surface of said windshield on the basis of the number of the generated first signals, and
    (b) successively comparing the level of said second detection signal with a second predetermined reference level so as to generate a second high-level signal whenever the level of each of said at least one second detection signal is higher than said second predetermined reference level and determining the presence of the extraneous matter on the inner surface of said windshield on the basis of the number of the generated second high-level signals.

6. Apparatus as in claim 5, further comprising an optical system located between said windshield and said transducer means for guiding the reflection light from the outer and inner surfaces of said windshield to said transducer means.

7. Apparatus as in claim 6, wherein said optical system includes filter means for transmitting only light having frequencies within a predetermined range.

8. Apparatus as in claim 6, wherein said first and second light-emitting means each comprise a respective plurality of infrared emitting diodes, said transducer means comprises an image sensor made of a silicon semiconductor, and said optical system comprises an infrared filter for transmitting only light with frequencies in a predetermined range.

9. Apparatus as in claim 6, wherein at least said first and second light-emitting means, said transducer means and said optical system are integrally encased in a housing disposed away from said inner surface of said windshield.

10. An apparatus as recited in claim 5, wherein said transducer means includes first transducing means for detecting the reflection light from the other surface of said windshield and second transducing means for detecting the reflection light from the inner surface of said windshield.

11. An apparatus for optically detecting the presence of extraneous matter on a windshield, comprising:
a housing located at an inner side of said windshield away from an inner surface of said windshield;
first light-emitting means, located within said housing and having at least one infrared-emitting diode, for emitting at least one light ray toward an outer surface of said windshield, each of said at least one infrared-emitting element emitting one of said at least one light ray;
second light-emitting means, located within said housing and having at least one second infrared-emitting diode, for emitting at least one second light ray toward the inner surface of said windshield, each of said at least one second infrared-emitting diode emitting one of said at least one second light ray;
first transducer means, located within said housing, for receiving said at least one light ray reflected on the outer surface of said windshield and emitted from said first light-emitting means so as to generate at least one first detection signal corresponding to a quantity of the reflection light on the outer surface of said windshield;
second transducer means, located within said housing, for receiving said at least one second light ray reflected on the inner surface of said windshield and emitted from said second light emitting means so as to generate at least one second detection signal corresponding to a quantity of the reflection light on the inner surface thereof; and
data processing means, responsive to said at least one first detection signal and said at least one second detection signal from said first and second transducer means, for successively comparing the level of each of said at least one first detection signal with a first predetermined reference level so as to generate a first signal when the level of each of said at least one first detection signal is higher than said first predetermined reference level, and for successively comparing the level of each of said at least one second detection signal with a second predetermined reference level so as to generate a second signal when the level of each of said at least one second detection signal is higher than said second predetermined reference level, said data processing means determining the presence of the extraneous matter on the outer surface of said windshield on the basis of the number of the of the extraneous matter on the inner surface of said windshield on the basis of the number of the generated at least one second signal.

12. An apparatus as recited in claim 11, wherein said first and second transducer means comprise image sensor elements made of silicon semiconductor.

13. An apparatus for optically detecting the presence of extraneous matter on a windshield comprising:
light emitting means, located at an inner side of said windshield, for emitting at least one first beam toward an outer surface of said windshield, and for emitting at least one second beam toward said inner surface of said windshield;
transducer means for receiving at least one of said at least one first beam after said at least one first beam has reflected from said outer surface of said windshield, and for receiving at least one of said at least one second beam after said at least one second beam has reflected from said inner surface of said windshield, said transducer means generating at least one corresponding first detection signal in response to each of said at least one reflected first beam, said transducer means generating at least one corresponding second detection signal in response to each of said at least one reflected second beam;
data processing means, responsive to said at least one first detection signal and said at least one second detection signal, for detecting the presence of extraneous matter on said outer surface of said windshield in response to said at least one first detection signal, and for determining extraneous matter on said inner surface of said windshield in response to said at least one second detection signal.

14. An apparatus as recited in claim 13, wherein said transducer means generates said at least one corresponding first detection signal in response to an intensity of each of said at least one reflected first beam; and said transducer means generates said at least one corresponding second detection signal in response to an intensity of each of said at least one reflected second beam.

15. An apparatus as recited in claim 14, wherein said data processing means detects the presence of the extraneous matter on said outer surface of said windshield in response to a first number of said at least one first detection signal that exceeds a first predetermined level; said data processing means determines said extraneous matter on said inner surface of said windshield in response to a second number of said at least one second detection signal that exceeds a second predetermined level.

16. An apparatus as recited in claim 15, further comprising an optical system located between said windshield and said transducer means for guiding the reflection light from the outer and inner surfaces of said windshield to said transducer means.

17. An apparatus as recited in claim 16, wherein at least said light emitting means, said transducer means and said optical system are integrally encased in a housing disposed away from said inner surface of said windshield.

18. An apparatus as recited in claim 17, wherein said optical system includes filter means for transmitting only light having frequencies within a predetermined range.

19. An apparatus as recited in claim 17, wherein said light emitting means comprises infrared emitting diodes, said transducer means comprises an image sensor made of a silicon semiconductor, and said optical system comprises an infrared filter for transmitting only light with frequencies in a predetermined range.

20. An apparatus as recited in claim 15, further comprising second transducer means for generating an ambient light signal in response to an intensity of external light introduced from an outer side of said windshield.

21. An apparatus as recited in claim 20, wherein said first predetermined level is adjusted in response to said ambient light signal.

22. An apparatus as recited in claim 20, wherein said second predetermined level is adjusted in response to said ambient light signal.

23. An apparatus for optically detecting the presence of extraneous matter on a windshield, comprising:

first light-emitting means installed at the inside of said windshield and having a plurality of light-emitting elements each emitting a light ray toward the outer surface of said windshield;

second light-emitting means installed at the inside of said windshield and having a plurality of light-emitting elements each emitting a light ray toward the inner surface of said windshield;

first transducer means having a plurality of transducer elements respectively receiving the light rays emitted from said plurality of light-emitting elements of said first light-emitting means and reflected on the outer surface of said windshield, said first transducer means generating first detection signals corresponding to quantities of the reflection light received by said plurality of transducer elements;

second transducer means having at least one transducer element for receiving external light introduced from the outside of said windshield into said optically detecting apparatus, said second transducer means generating a second detection signal corresponding to the quantity of external light;

third transducer means having a plurality of transducer elements respectively receiving the light rays emitted from said plurality of light-emitting elements of said third light-emitting means and reflected on the inner surface of said windshield, said third transducer means generating third detection signals corresponding to quantities of the reflection light received by said plurality of transducer elements thereof; and data processing means responsive to said first detection signals, said second detection signal and said third detection signals for successively comparing the level of said first detection signals with a first predetermined reference level so as to generate a first high-level signal when the level of each of said first detection signals is higher than said first predetermined reference level, for comparing the level of said second detection signal with a second predetermined reference level and for successively comparing the level of each of said third detection signals with a third predetermined reference level so as to produce a third high-level signal when the level of each of said third detection signals is higher than said third predetermined reference level, said data processing means determining the presence of extraneous matter on said windshield on the basis of the number of the generated first high-level signals, determining the degree of brightness outside said windshield in accordance with the result of the comparison of the level of said second detection signal with said second predetermined reference level and determining the fogging state on the inner surface of said windshield on the basis of the number of the produced third high-level signals.

24. An apparatus as claimed in claim 23, wherein said first predetermined reference level is adjusted in accordance with the result of the comparison of the level of said second detection signal with said second predetermined reference level.

25. An apparatus as claimed in claim 23, wherein said third predetermined reference level is adjusted in accordance with the result of the comparison of the level of said second detection signal with said second predetermined reference level.

26. An apparatus as claimed in claim 23, wherein said first and second light-emitting means are structurally integrated with each other, and said first to third transducer means are structurally integrated with each other.

27. An apparatus for optically detecting the presence of extraneous matter on a windshield, comprising:

first light-emitting means installed at the inside of windshield to be in spaced relation to said windshield and having a plurality of light-emitting elements each emitting a light ray toward the outer surface of said windshield;

windshield to be in spaced relation to said windshield and having a plurality of light-emitting elements each emitting a light ray toward the inner surface of said windshield;

transducer means having a plurality of transducer elements which receive at least one of the light rays emitted from said plurality of light-emitting elements of said first light-emitting means and reflected on the outer surface of said windshield, and which receive at least one of the light rays emitted from said plurality of light-emitting elements of said second light emitting means and reflected on the inner surface of said windshield so as to generate first detection signals corresponding to quantities of the reflection light on the outer surface of said windshield and to generate second detection signals corresponding to quantities of the reflection light on the inner surface thereof; and data processing means responsive to said first detection signals and said second detection signals from said transducer means for successively comparing the level of each of said first detection signals with a first predetermined reference level so as to produce a first signal when the level of each of said first detection signals is higher than said first predetermined reference level and for successively comparing the level of each of said second detection signals with a second predetermined reference level so as to produce a second signal when the level of each of said second detection signals is higher than said second predetermined reference level, said data processing means determining the presence of extraneous matter on the outer surface of said windshield on the basis of the number of the produced first signals and determining the presence of the extraneous matter on the inner surface of said windshield on the basis of the number of the produced second signals.

28. An apparatus as claimed in claim 27, further comprising an optical system provided between said windshield and said transducer means for guiding the reflection light from the outer and inner surfaces of said windshield to said transducer means.

29. An apparatus as claimed in claim 28, wherein said optical system includes filter means for transmitting only light with frequencies in a predetermined range.

30. An apparatus as claimed in claim 28, wherein each of said first and second light-emitting means comprises as said light-emitting elements plurality of infrared emitting diodes and said transducer means is made of an image sensor made of a silicon semiconductor and said optical system includes an infrared filter for transmitting only light with frequencies in a predetermined range.

31. An apparatus as claimed in claim 28, wherein said at least said first and second light-emitting means, said transducer means and said optical system are integrally encased in a housing which is placed to be spaced from said windshield.

32. An apparatus as claimed in claim 27, wherein said transducer means includes first transducing means for detecting the reflection light from the outer surface of said windshield and second transducing means for detecting the reflection light from the inner surface thereof.

33. An apparatus as claimed in claim 32, wherein said first and second transducing means are structurally integrated with each other.

34. An apparatus for optically detecting the presence of extraneous matter on a windshield, comprising:
- a housing placed at the inside of said windshield so as to be in spaced relation thereto;
- first light-emitting means encased in said housing and having a plurality of infrared-emitting diodes each emitting a light ray toward the outer surface of said windshield;
- second light-emitting means encased in said housing and having a plurality of infrared-emitting diodes each emitting a light ray toward the inner surface of said windshield;
- first transducer means encased in said housing and comprising image sensor means made of a silicon semiconductor which receives the light rays emitted from said light-emitting means and reflected on the outer surface of said windshield so as to generate first detection signals corresponding to quantities of the reflection light on the outer surface of said windshield;
- second transducer means encased in said housing and comprising image sensor means made of a silicon semiconductor which receives the light rays emitted from said second light emitting means and reflected on the inner surface of said windshield so as to generate second detection signals corresponding to quantities of the reflection light on the inner surface thereof; and
- data processing means responsive to said first detection signals and said second detection signals from said first and second transducer means for successively comparing the level of each of said first detection signals with a first predetermined reference level so as to produce a first signal when the level of each of said first detection signals is higher than said first predetermined reference level and for successively comparing the level of each of said second detection signals with a second predetermined reference level so as to produce a second signal when the level of each of said second detection signals is higher than said second predetermined deference level, said data processing means determining the presence of the extraneous matter on the outer surface of said windshield on the basis of the number of the produced first signals and determining the presence of extraneous matter on the inner surface of said windshield on the basis of the number of the produced second signals.

* * * * *

UNITED STATES PATENT AND TRADEMARK OFFICE
CERTIFICATE OF CORRECTION

PATENT NO. : 4,867,561

DATED : September 19, 1989

INVENTOR(S) : MAKINO, Yasuaki and OTAKE, Seiichiro

It is certified that error appears in the above-identified patent and that said Letters Patent is hereby corrected as shown below:

On the Title page:

[75] Inventors: Yasuaki MAKINO, Okazaki;
Seiichiro OTAKE, Hazu, both
of Japan

Signed and Sealed this

Twenty-third Day of October, 1990

*Attest:*

HARRY F. MANBECK, JR.

*Attesting Officer*      *Commissioner of Patents and Trademarks*